United States Patent
Solow

[15] 3,643,479
[45] Feb. 22, 1972

[54] ELECTRONIC HOOD AND TRUNK-LOCKING DEVICE

[72] Inventor: Joseph Solow, P.O. Box 116, Plainview, N.Y. 11803

[22] Filed: May 22, 1970

[21] Appl. No.: 39,697

[52] U.S. Cl..............................70/241, 70/281, 292/144, 317/151, 320/1
[51] Int. Cl. .....................E05b 65/19, E05b 47/02
[58] Field of Search ............70/241, 264, 281; 292/144, 292/181

[56] References Cited

UNITED STATES PATENTS

| 2,499,727 | 3/1950 | Craig | 70/264 X |
| 2,786,701 | 3/1957 | Povlich | 292/144 |
| 2,828,151 | 3/1958 | Brotman et al. | 292/181 X |

FOREIGN PATENTS OR APPLICATIONS 1,041,439  10/1953  France..................292/144

Primary Examiner—Albert G. Craig, Jr.
Attorney—Polachek & Saulsbury

[57] ABSTRACT

A locking device for an enclosure such as a hood or trunk of an automobile includes a casing having a slidable bolt actuated by a first solenoid and held by a lever in extended position. A second solenoid retracts the lever to permit retraction of the bolt by a spring. A switch in the casing is disposed for operation by the bolt when the bolt is retracted. The first and second solenoids are operable in response to actuation of a key controlled switch and associated electronic circuitry which includes two opposing transistors. The first solenoid is actuated by discharges of a capacitor through one of the transistors when the other transistor is rendered nonconductive.

9 Claims, 8 Drawing Figures

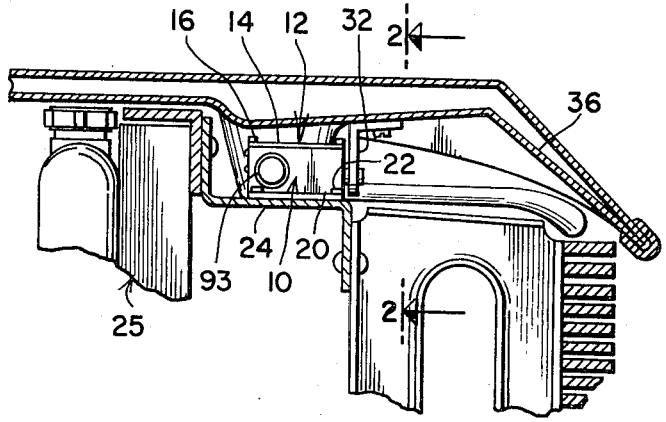
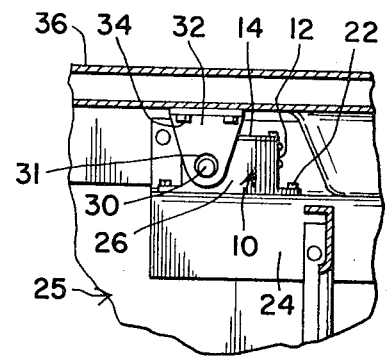
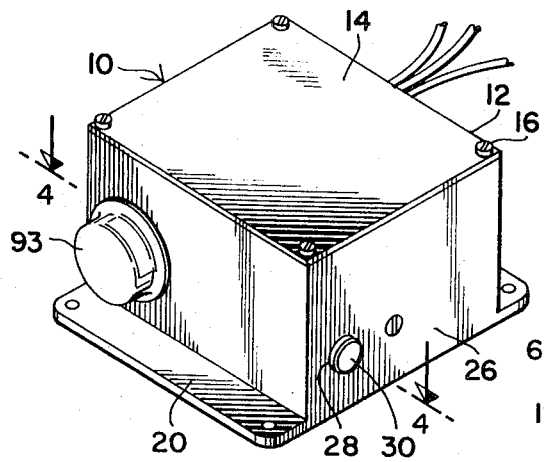
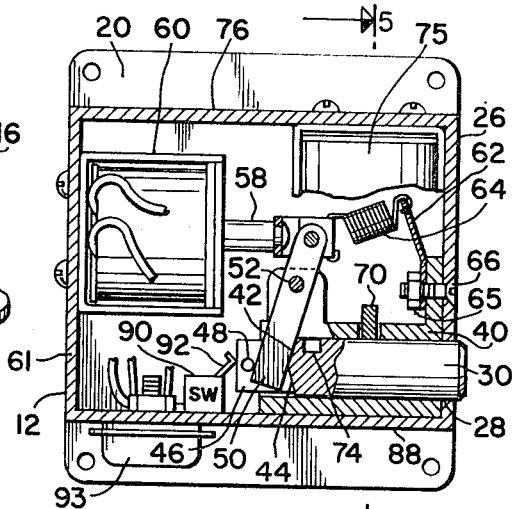
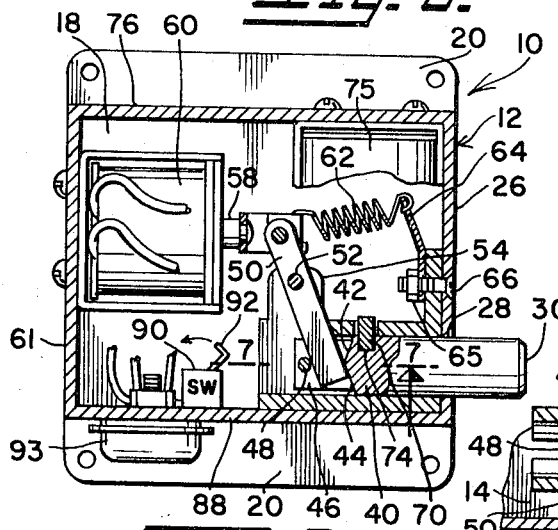
INVENTOR.
JOSEPH SOLOW

ELECTRONIC HOOD AND TRUNK-LOCKING DEVICE

This invention concerns an electronic, transistorized locking device for a hood or trunk of an automotive vehicle.

Hood and trunk locks for automobiles and other automotive vehicles have generally been mechanically operated. A key is inserted directly into the cylinder of a lock which is located at the hood or trunk. Another known type of hood lock employs a bolt connected to a flexible cable which terminates at a key operated cylinder located at the dashboard inside a vehicle. When an appropriate key is inserted in the cylinder and turned, the bolt is withdrawn from a catch under the hood.

The present invention has a principal object provision of an electronically operated lock for an automotive vehicle. According to the invention, a transistorized circuit is provided which is connected to the ignition lock of a vehicle. When the ignition key is inserted in the ignition lock and turned, the lock bolt is withdrawn in response to energization of solenoid means from a catch at the hood of the vehicle. A similar lock can be provided at the trunk of the vehicle. Both locks can be actuated simultaneously when the ignition key is turned in the ignition lock. When the ignition key is turned to turn off the engine of the vehicle, the electronically operated lock or locks are closed automatically. At the same time that the ignition is turned off, a switch actuated by the lock bolt opens the ignition coil circuit of the vehicle.

Electronically operated locks heretofore known have not been employed for locking hooks or trunks of automobiles because they are not adapted for this purpose. Usually they employ complicated circuitry. They include relays, rectifiers, tuned circuits and the like. Usually they operate on alternating current supplied by a remote power supply. They often have special keys which themselves form part of the electrical circuitry. The present invention avoids the objections, difficulties and disadvantages of prior mechanical hood and trunk locks and of prior locks operated electrically or electronically. No extra or special keys are required.

Other and further features, objects and advantages of the invention will become apparent from the following detailed description taken together with the drawings, wherein:

FIG. 1 is a side view of an electronically actuated lock embodying the invention shown installed under the hood of a vehicle.

FIG. 2 is a vertical sectional view taken on line 2—2 of FIG. 1.

FIG. 3 is a perspective view of the electronic lock per se, on an enlarged scale.

FIG. 4 is a horizontal sectional view taken on line 4—4 of FIG. 3, the lock being shown in open condition.

FIG. 5 is a vertical sectional view taken on line 5—5 of FIG. 4.

FIG. 6 is a sectional view similar to FIG. 5, showing the lock in closed or locked condition.

FIG. 7 is a fragmentary sectional view taken on line 7—7 of FIG. 6.

Figure 8:
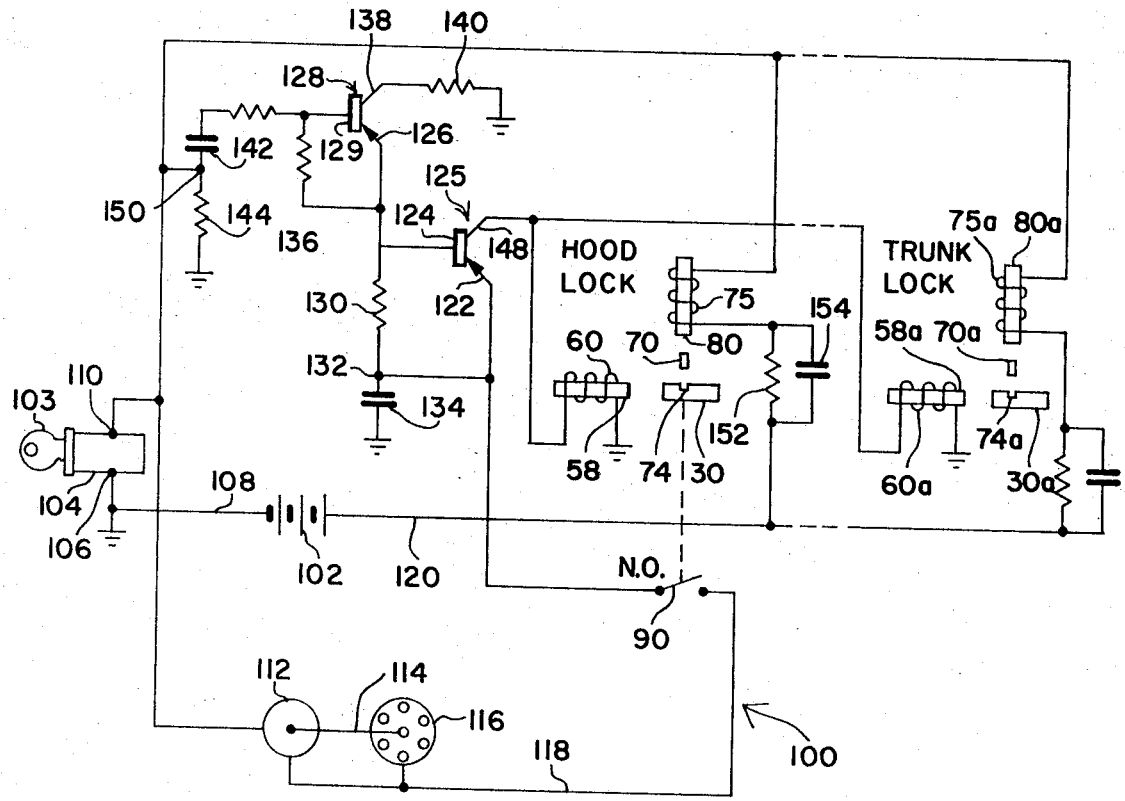
FIG. 8 is a diagram of the transistorized electronic circuit of the locking device.

Referring first to FIGS. 1—7, there is shown a locking device 10 comprising a rectangular casing 12 having an open top closed by a cover plate 14 held by screws 16. The closed bottom 18 of the casing has aperture flanges 20 which can be secured by screws 22 to a bracket or plate 24 forming part of the frame of an automotive vehicle 25; FIGS. 1 and 2. In the front wall 26 of the casing is an opening 28. An axially movable cylindrical bolt 30 can be extended out of the casing and engaged in a hole 31 in a catchplate 32 secured by screws 34 to the underside of hood 36 of the vehicle. When the bolt 30 is so extended the lock is in closed condition and the hood is held securely closed and cannot be pried open by forcibly retracting the bolt.

The mechanical arrangement by which this is accomplished is best shown in FIGS. 4—7. Inside the casing on wall 26 is secured a rectangular channel-shaped clock 40 in which the cylindrical bolt 30 is axially slidable. The inner or rear end of the bolt is formed with flat faces 42, 44 angularly disposed to each other. A pair of laterally spaced fingers 46 extend rearwardly from faces 42, 44. These fingers carry a horizontal cross pin 48. A lever 50 is pivotally mounted by pin 52 on stationary ears 54 extending laterally from block 40. The lower end of this lever extends into the space between pin 48, end faces 42, 44 of the bolt, and fingers 46. The upper end of the lever is pivotally secured by pin 56 to plunger 58 of a solenoid 60 which is secured on rear wall 61 of the casing. A coil spring 62 is secured between the plunger and a clip 64 secured by nut 65 on bolt 66 which holds the block 40 in place in the casing. When the plunger 58 is retracted, bolt 30 is extended as shown in FIG. 6. Spring 62 is then expanded and under tension. When the plunger is extended and the spring is contracted and the bolt is retracted as shown in FIG. 4, the bolt is held extended by another lever 70 pivotally secured to a pin 72 at the bottom of block 40. Lever 70 turns on an axis parallel to the axis of the bolt in plane perpendicular to the bolt; see FIG. 5. Lever 70 engages in a lateral slot 74 formed in the bolt and thus holds the bolt in place and prevents retraction thereof as shown in FIG. 6.

Another solenoid 75 is secured in the casing on sidewall 76. This solenoid has a plunger 80 carrying a pin 82 which is pivotally engaged with the upper end of lever 70. A coil spring 84 secured between plunger 80 and a clip 86 on sidewall 88 of the casing tends to urge the lever 70 into slot 74 in the bolt. When the solenoid 75 is actuated, lever 70 is retracted as shown in FIG. 5. It clears slot 74 and the bolt is pulled axially forward by spring 62 to extend from the casing. When the bolt is extended upon actuation of solenoid 60, lever 70 is pulled into slot 74 by spring 84 to hold the bolt extended. Solenoid 60 thus operates to extend the bolt, and solenoid 75 operates to release the bolt to permit it to retract axially. A normally open switch 90 having an operating arm 92 is disposed in the casing for operation by the bolt 30 which releases arm 92 when the bolt is extended. Transistor housing 93 on casing wall 88 contains transistors which are connected in circuit 100 shown in FIG. 8 to which reference is now made. Circuit 100 includes a battery 102 which is preferably the battery of the vehicle which energizes the ignition circuit. The ignition circuit includes a key operated switch 104 having one terminal 106 connected to grounded terminal 108 of the battery. The other terminal 110 of the ignition key switch is connected to ignition coil 112. Wire 114 is connected from coil 112 to the distributor 116. The return line 118 is connected to terminal 120 of the battery via switch 90. The switch is operated by bolt 30 arranged for retraction by plunger 58 of solenoid 60.

Terminal 120 of the battery is also connected to emitter 122 of a transistor 125. Base 124 of the transistor is connected to emitter 126 of transistor 128. The base 124 of transistor 125 is connected to emitter via a resistor 130. Junction point 132 is connected to ground via a capacitor 134. Base 129 of transistor 128 is connected to emitter 126 via a resistor 136. Collector 138 of transistor 128 is connected to ground via resistor 140. Base 129 of transistor 128 is connected via a resistor 142 and a capacitor 144 to ground. Collector 148 of transistor 125 is connected to solenoid 60. Solenoid 75 is connected at one terminal to ignition switch terminal 110. This terminal is also connected to junction point 150 of capacitor 142 and resistor 144. The other terminal of solenoid 75 is connected to ground via resistor 152 and capacitor 154. Solenoid 75 has a plunger 80 disposed to actuate lever 84 by retracting it from slot 74 in bolt 30.

If a trunk lock is to be installed in the vehicle, then another lock including another solenoid 60a will be installed at the trunk door in a manner similar to the arrangement shown in FIGS. 1 and 2 for the hood lock. Solenoid 60a will be connected in parallel with solenoid 60 between collector 148 and ground. Solenoid 60a will have a plunger 58a to retract bolt 30a which is held in place by a lever 70a actuated by plunger 80a of another solenoid 75a. Solenoid 75a will be connected at one terminal in parallel with solenoid 75 to switch terminal 110. The other terminal of solenoid 75a will be connected via resistor 152a and capacitor 154a to battery terminal 120.

In operation of the locking device including circuit 100, assume that the switch 104 is open and key 103 is removed. Bolt 30 will be extended as shown in FIGS. 1 and 6 in the closed position of the locking device or locked position of the hood 36 or trunk door (not shown). Switch 90 will be open as shown in FIG. 8. The ignition circuit will thus be open at both switch 104 and at switch 90. The bolt 30 will be held extended by engagement of lever 70 in slot 74 against tension in expanded spring 62. Suppose now that the key 103 is inserted in the lock switch 104 and turned. This will close the circuit of solenoid 75 to energize the solenoid and cause retraction of lever 70. Spring 62 will contract and will retract bolt 30 out of engagement with catch plate 32. When the bolt is fully retracted, arm 92 of switch 90 will be engaged and this will close the switch to close the ignition coil circuit. Solenoid 75 remains energized drawing a negligible amount of current which is limited by resistor 152. If a similar locking device is provided at the trunk of the vehicle, bolt 30a will be retracted since solenoid 75a will become energized to retract lever 70a from slot 74a of the bolt.

When switch 104 is closed, transistor 128 becomes conductive. Transistor 125 however is maintained in a nonconductive condition since positive voltage is applied to both the base 124 and emitter 122. Capacitor 134 becomes charged and remains in charged condition.

The open condition of the locking device as described above continues until it is desired to turn off the engine of the vehicle by opening switch 104. The key 103 will be turned to open the switch. This will open the ignition coil circuit and the engine will stop. At the same time transistor 128 will be cut off due to the opening of switch 104. Capacitor 134 will discharge through transistor 125 which becomes momentarily conductive. The current through transistor 125 passes through solenoid 60 and also through solenoid 60a if present. This will cause retraction of plungers 58, 58a and extension of bolts 30 and 30a. At the same time solenoids 75 and 75a become deenergized and levers 70 and 70a are released to engage in slots 74 and 74a as the bolts 30 and 30a become fully extended. Immediately thereafter solenoids 60 and 60a become deenergized because capacitor 134 is fully discharged and transistor 125 stops conducting. However the bolts are held in extended, locked position by engagement of lever bars 70, 70a in the slots 74, 74a. Also switch 90 opens to open the ignition coil circuit. This is the locked condition illustrated in FIGS. 6 and 8.

The system provides security against tampering with the ignition circuit since the ignition circuit remains open as long as bolts 30 and 30a are in extended, locked position. By the arrangement described the single ignition key 103 controls locking and unlocking of the hood and trunk. Starting of the engine automatically locks the hood and trunk and stopping the engine automatically locks the hood and trunk.

The locking device has been described in connection with automatic locking and unlocking of a hood and trunk of a vehicle. The locking device is applicable to remote electronic locking of doors to enclosures of all types. The locking device is easy to install. No special skill is required. The locking device can be installed in a few minutes in any conventional automobile, truck, bus or other automotive vehicle.

While a preferred embodiment of the invention has been disclosed, this has only been by way of example. Many variations and modifications are possible without departing from the invention as defined by the appended claims.

What is claimed is:

1. A locking device for an enclosure in a vehicle or the like comprising a casing, a bolt axially slidable in said casing, a first solenoid in said casing, a first lever operatively connected to the solenoid and arranged to extend the bolt from the casing into a locked position thereof when the solenoid is energized, a second solenoid in the casing, a second lever in the casing arranged to engage the bolt and to hold it extended in the locked position, means operatively connecting the second lever and second solenoid to release the bolt for retraction to open position when the second solenoid is energized, a key controlled switch, and electronic circuitry interconnecting said switch and first solenoid for energizing the same to extend the bolt when said switch is opened.

2. A locking device as defined in claim 1, further comprising a first spring connected between said casing and said first lever for retracting the bolt when the first solenoid is deenergized.

3. A locking device as defined in claim 2, further comprising a second spring connected between said casing and said second lever and tending to urge the second lever into engagement with said bolt.

4. A locking device as defined in claim 1, further comprising normally open switch means, said switch means being disposed in said casing adjacent to said bolt and arranged to be closed by the bolt when the bolt is in retracted, open position.

5. A locking device as defined in claim 1, said electronic circuitry comprising a power supply, a first transistor connected in circuit with said switch and power supply and maintained in a conductive condition when the switch is closed, a second transistor connected in circuit with the first transistor and maintained in nonconductive condition when the first transistor is conducting, a capacitor connected in circuit with the first and second transistors and maintained in a charged condition while the first transistor is conducting, means connecting said first solenoid in circuit with the second transistor and capacitor and maintaining the first solenoid in deenergized condition when the second transistor is nonconducting, whereby the charged capacitor discharges through said second transistor and said first solenoid when the first transistor is cut off by opening of said switch, so that the bolt is extended from the casing into said locked position.

6. A locking device as defined in claim 5, wherein the second solenoid is connected in circuit with said switch and power supply to be energized thereby for releasing said bolt to retract the same when the switch is closed.

7. A locking device as defined in claim 6, further comprising normally open switch means disposed in said casing adjacent to said bolt and arranged to be closed by the bolt when the bolt is in retracted, open position.

8. A locking device as defined in claim 7, further comprising electrical circuit means connected in circuit with said key-controlled switch and said normally open switch, so that said electrical circuit means is closed only when the key-controlled switch is closed and said bolt is in retracted, open position.

9. A locking device as defined in claim 7, further comprising a first spring connected between said casing and said first lever for retracting the bolt to open position when the first solenoid is deenergized; and a second spring connected between said casing and said second lever and tending to urge the second lever into engagement with said bolt, said bolt having a lateral slot disposed for engagement by said second lever when the bolt is in said closed, extended position.

* * * * *